US005479490A

United States Patent [19]

Nakashima

[11] Patent Number: 5,479,490
[45] Date of Patent: Dec. 26, 1995

[54] VOICE RESPONSIVE REMOTE-CONTROLLABLE SYSTEM

[75] Inventor: Tomoyuki Nakashima, Hino, Japan

[73] Assignee: Kabushiki Kaisha Toshiba, Kawasaki, Japan

[21] Appl. No.: 262,361

[22] Filed: Jun. 20, 1994

Related U.S. Application Data

[63] Continuation of Ser. No. 829,541, Feb. 4, 1992, abandoned, which is a continuation of Ser. No. 560,724, Jul. 31, 1990, abandoned.

[30] Foreign Application Priority Data

Jul. 31, 1989 [JP] Japan ..................... 1-198403

[51] Int. Cl.$^6$ .................. H04M 1/64; G10L 7/08
[52] U.S. Cl. .................. 379/74; 379/67
[58] Field of Search .................. 379/67, 74, 77, 379/88, 89, 410, 80

[56] References Cited

U.S. PATENT DOCUMENTS

| | | | |
|---|---|---|---|
| 4,514,593 | 4/1985 | Hattori et al. | 379/74 |
| 4,571,457 | 2/1986 | Hattori et al. | 379/56 |
| 4,591,664 | 5/1986 | Freeman | 379/77 X |
| 4,757,525 | 7/1988 | Matthews et al. | 379/197 X |
| 4,899,373 | 2/1990 | Lee et al. | 379/207 |
| 4,914,692 | 4/1990 | Hartwell et al. | 379/410 |
| 4,920,559 | 4/1990 | Hashimoto | 379/77 X |
| 5,050,206 | 9/1991 | Shimanuki | 379/77 X |
| 5,125,024 | 6/1992 | Gokcen et al. | 379/410 X |

FOREIGN PATENT DOCUMENTS

| | | | |
|---|---|---|---|
| 2134927 | 1/1973 | Germany | 379/74 |
| 0197947 | 11/1983 | Japan | 379/74 |
| 0014560 | 1/1985 | Japan | 379/74 |
| 0030855 | 2/1986 | Japan | 379/74 |

OTHER PUBLICATIONS

"Digital Processing of Speech Signals," Rabiner et al., 1978 pp. 130–135.

*Primary Examiner*—Jeffery A. Hofsass
*Assistant Examiner*—Daniel S. Hunter
*Attorney, Agent, or Firm*—Foley & Lardner

[57] ABSTRACT

There is disclosed a system which can be subjected to remote control by an input voice command, which comprises: a voice detection circuit for detecting inputting of a voice signal; a voice command introduction circuit for introducing an inputted voice command after the detection by the voice detection circuit; a speech recognition circuit for making a comparison between the voice command introduced by the voice command introduction circuit and a voice command registered in advance to thereby recognize the introduced voice command; and a control circuit for executing, in dependency upon a recognition result from the speech recognition circuit, a command determined in advance in correspondence with the registered voice command, wherein after input of the voice signal is detected, introduction of the inputted voice command is initiated, whereby execution of the command determined in advance is carried out in dependency upon the recognition result of the introduced voice command.

2 Claims, 3 Drawing Sheets

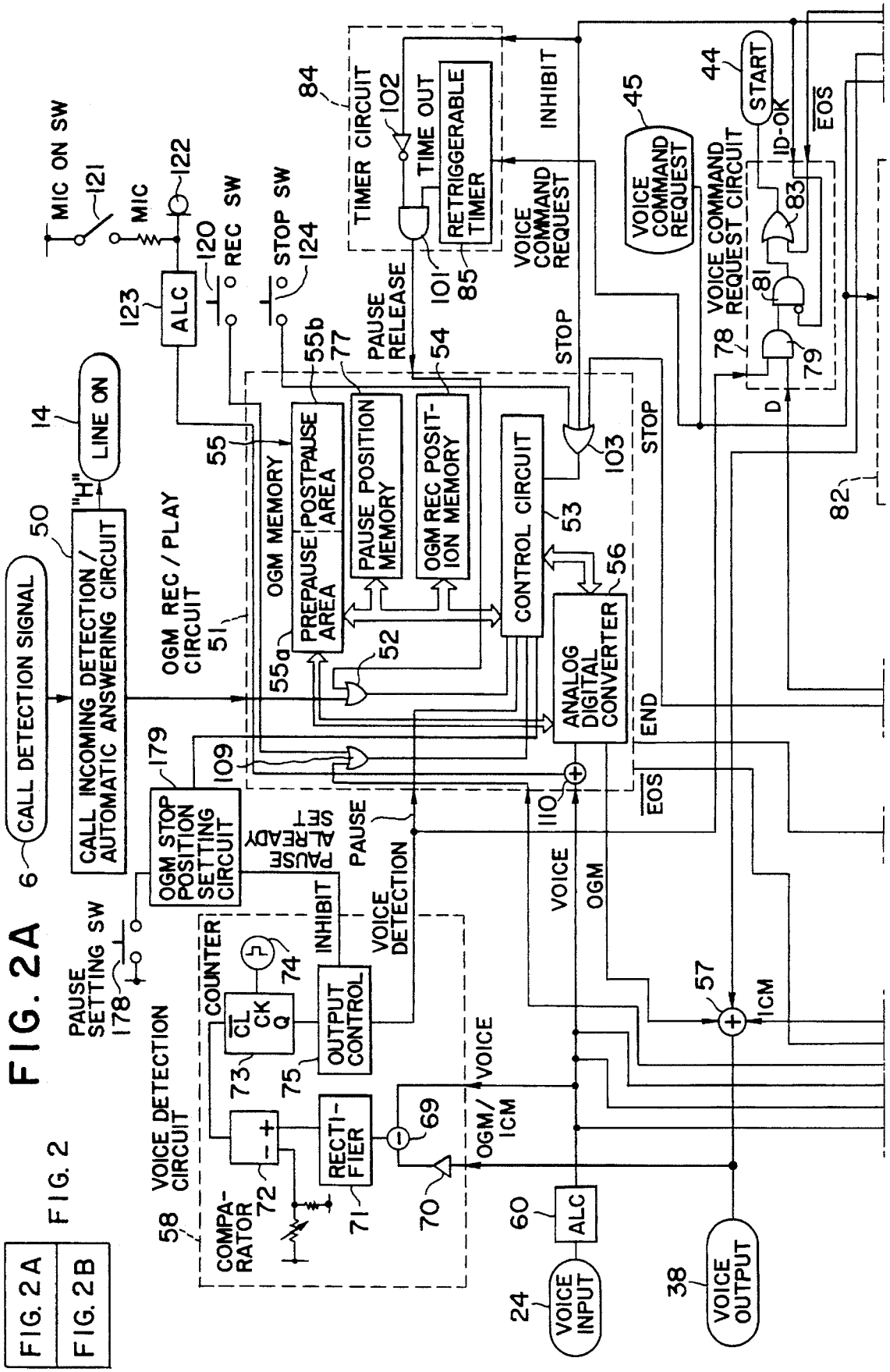

VOICE RESPONSIVE REMOTE-CONTROLLABLE SYSTEM

This application is a continuation of application Ser. No. 07/829,541, filed Feb. 4, 1992, now abandoned, which is a continuation of application Ser. No. 07/560,724, filed Jul. 31, 1990, now abandoned.

BACKGROUND OF THE INVENTION

This invention relates to a system which can be subjected to remote control by a voice command signal, and more particularly to a voice responsive remote-controllable system suitable for application to, e.g., a terminal answering device, etc.

By taking an example of a terminal answering device, the prior art will be first described.

When there is a call incoming, a conventional terminal answering device automatically responds to that call incoming to transmit an outgoing message (hereinafter referred to as an OGM). After the OGM has been transmitted, the terminal answering device then records an incoming message (hereinafter referred to as an ICM) from a calling subscriber. However, when a multi-frequency (MF) signal is transmitted from a calling subscriber during transmission of OGM, the MF signal detector detects this MF signal. As the result of the detection, where that MF signal is in correspondence with an MF signal determined in advance (e.g., "* dial"), this terminal answering device stops transmission of OGM and is then placed in a detection mode for an identification code (ID code).

An ID code is registered in advance into this terminal answering device by an owner thereof, and is expressed as a code train comprised of a plurality of dial numbers (e.g., "1, 2, 3").

After this terminal answering device is placed in the detection mode for ID code, when a MF signal train is transmitted from a calling subscriber, the MF signal detector detects this signal train to compare the detected result with an ID code registered in advance. If that detected result is in correspondence with the registered ID code, this terminal answering device transmits an audible sound for allowing the calling subscriber to confirm that this terminal answering device has accepted that ID code. In contrast, where the above-mentioned detected result is not in correspondence with the registered ID code, this terminal answering device transmits for a second time an audible sound for requesting the calling subscriber to transmit a MF signal train.

When the ID code is accepted, this terminal answering device is placed in a command standby state. At this time, where a MF signal transmitted from the calling subscriber is in correspondence with a command determined in advance, this terminal answering device is placed in an operational mode corresponding to that command. Such commands are MF signal trains determined in advance which correspond to the operational modes of the device with a one to one correspondence relationship. This relationship is determined in a manner that, for example, command "#1" corresponds to an ICM playback operation, command "#2" corresponds to an OGM recording operation, and command "#" corresponds to a stop operation.

When it is assumed that an MF signal train "#1" is transmitted from a calling subscriber in a command standby state, a PB signal detector detects this signal train to make a comparison as to whether that signal train is in correspondence with a command determined in advance. In this example, since that signal train is in correspondence with the command "#1", playback of ICMs recorded in the past is initiated. When it is then assumed that an MF signal "#" is transmitted from a calling subscriber during playback of ICMs, detection/comparison are similarly conducted to stop playback of ICMs. Thus, this terminal answering device is placed in a next command standby state.

In this way, this terminal answering device is subjected to remote control by MF signals.

As stated above, in a remote controlled system such as a conventional terminal answering device, MF signals are used as ID codes or commands. For this reason, in order to conduct remote control of such a system, equipment such as, for example, a telephone system for an MF line having a function to transmit MF signals must be used. Namely, conventional equipment cannot be subjected to remote control from equipment such as, for example, a telephone system exclusive for a DP line which does not have a function to transmit MF signals.

SUMMARY OF THE INVENTION

An object of this invention is to provide a voice responsive remote-controllable system which can be subjected to remote control by using command signals even from equipment like a telephone system exclusive for a DP line which does not have a function to transmit MF signals.

In accordance with this invention, there is provided a system which can be subjected to remote control by an input voice command, which comprises: voice detection means for detecting inputting of a voice signal; voice command introduction means for introducing an inputted voice command after the detection by the voice detection means; speech recognition means for making a comparison between the voice command introduced by the voice command introduction means and a voice command registered in advance to thereby recognize a speech signified by the inputted voice command; and control means for executing, in dependency upon a recognized result from the speech recognition means, a command determined in advance in correspondence with the registered voice command, wherein after inputting of the voice signal is detected, introduction of the inputted voice command is initiated, whereby execution of the command determined in advance is carried out in dependency upon a recognized result of the speech signified by the introduced voice command.

BRIEF DESCRIPTION OF THE DRAWINGS

In the accompanying drawings:

FIGS. 2, 2A and 2B are a circuit diagram showing a detailed configuration of an automatic answering circuit 5 of the embodiment shown in FIG. 1.

DESCRIPTION OF THE PREFERRED EMBODIMENT

A preferred embodiment of a voice responsive remote-controllable system according to this invention will now be described with reference to the attached drawings.

Figure 1:
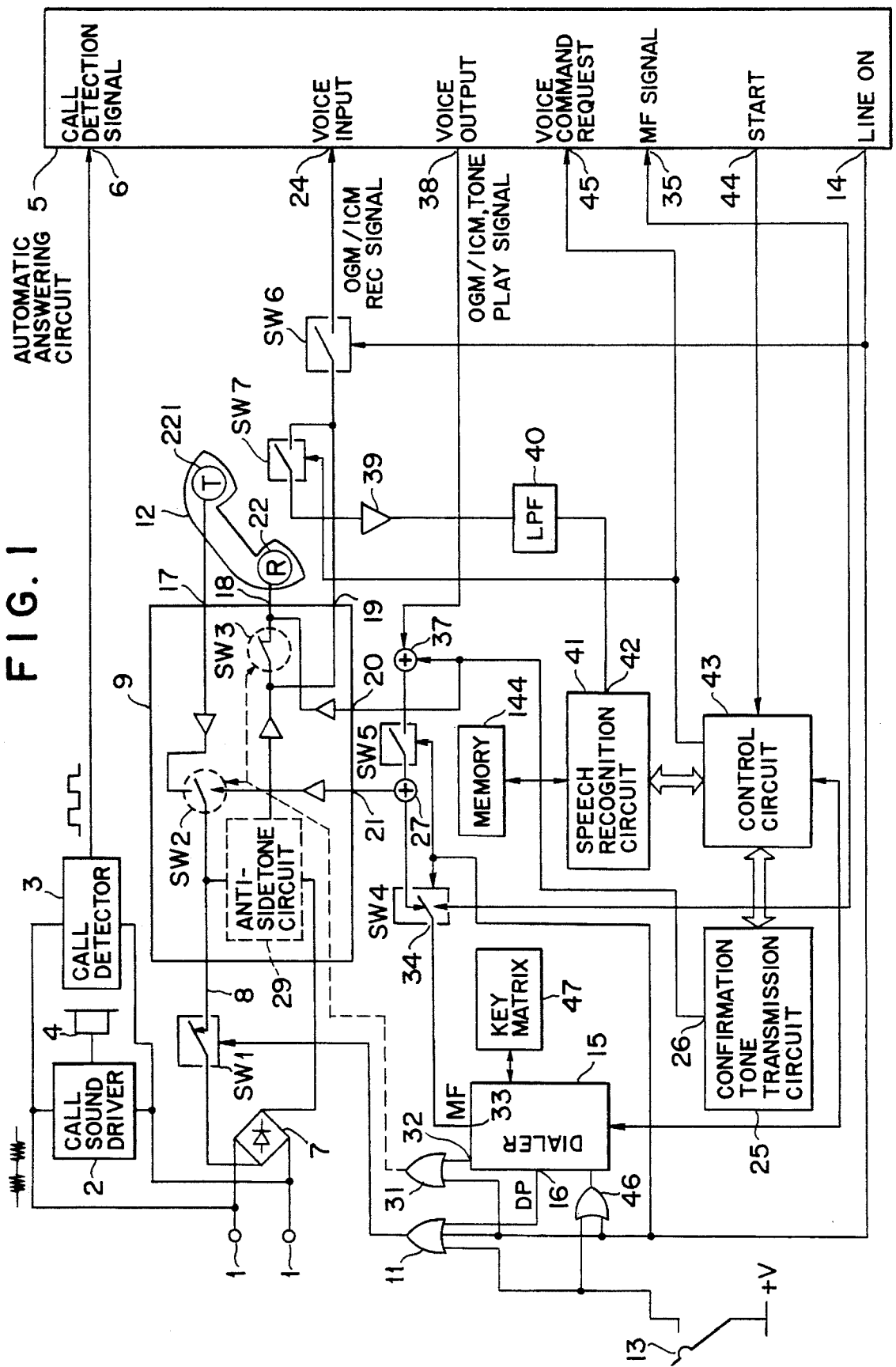
FIG. 1 is a block diagram showing the entire configuration of an embodiment in which a voice responsive remote-controllable system according to this invention is applied to a terminal answering device.

FIG. 1 shows the entire configuration of this embodiment. In this embodiment, this invention is applied to a terminal answering device.

This terminal answering device is connected to an office line (not shown) through line connection terminals 1. A call sound driver 2 and a call detector 3 are connected in parallel with the terminals 1. When a call arrives at this terminal answering device, a call signal of an a.c. signal of 16 Hz is inputted at a fixed interval from the office line to the terminals 1. The call sound driver 2 responds to a call signal to drive a sounder 4 to generate an audible sound. Furthermore, the call detector 3 converts a call signal to a call detection signal of a square waveform to deliver it to a call detection signal terminal 6 of an automatic answering circuit 5. The automatic answering circuit 5 serves to execute various functions required for a terminal answering device, e.g., automatic answering operation to a call, services such as recording/playback of OGM/ICM, etc., recognition of ID codes and commands, and the like. The details of the automatic answering circuit 5 will be described later.

An internal speech line 8 is also connected to the terminals 1 through a rectifier circuit 7. A speech network 9 is connected to the internal speech line 8. An office line acquisition switch SW1 is provided in the internal speech line 8, and is subjected to on/off control by an output signal from an OR gate 11. Respective voltage signals from a hook switch 13 interlocking with on-hook/off-hook states of a hand set 12, a line on terminal 14 of the automatic answering circuit 5, and a dial pulse (DP) output terminal 16 of a dialer 15 are inputted to the OR gate 11. Accordingly, when the handset 12 is placed in the off-hook state, or when the automatic answering circuit 5 outputs a signal of the H level from the line on terminal 14 in order to conduct an automatic answering operation, the switch SW1 is closed, thus to close the internal speech line 8 connecting the office line and the speech network 9. Furthermore, when the dialer 15 transmits a DP signal, the switch SW1 repeats on/off operation in synchronism with the DP signal to transmit that DP signal to the office line.

The speech network 9 includes a transmitter terminal terminal 19, a confirmation tone input terminal 20, and a MF signal input terminal 21. The transmitter terminal 17 is connected to a transmitter 221 in the handset 12. The receiver terminal 18 is connected to a receiver 22 in the handset 12. The receive preamplifier output terminal 19 is connected to a switch SW6. The switch SW6 is connected to a voice input terminal 24 of the automatic answering circuit 5. The confirmation tone input terminal 20 is connected to an output terminal 26 of a confirmation tone transmission circuit 25. The MF signal input terminal 21 is connected to the output terminal of an adder 27. In the speech network 9, either the transmitter terminal 17 or the MF signal input terminal 21 is selectively connected to the internal speech line 8 by a changeover switch SW2. Moreover, the internal speech line 8 is connected to the receive preamplifier output terminal 19 and the switch SW3 through an antisidetone circuit 29, and the switch SW3 is connected to the receiver terminal 18. Furthermore, the confirmation tone input terminal 20 is connected to the receiver terminal 18. The switches SW2 and SW3 are controlled by an output signal from an OR gate 31, and two input terminals of the OR gate 31 are connected to a control terminal 32 of the dialer 15 and the line on terminal 14 of the automatic answering circuit 5, respectively. Furthermore, a switch SW6 is controlled by a voltage signal from the line on terminal 14. When switches SW2, SW3 and SW6 are positioned as shown, a voice signal from the transmitter 221 is transmitted to the office line through the internal speech line 8, and a voice signal from the office line is inputted to the receiver 22 through the internal speech line 8 and the antisidetone circuit 29. When the dialer 15 outputs a signal of H level from the terminal 32 in order to transmit a MF signal, the switch SW2 is switched to the MF signal input terminal 21 side and the switch SW3 is turned OFF. Furthermore, also when the automatic answering circuit 5 outputs a signal of H level from the line on terminal 14 in order to conduct an automatic answering operation, the switches SW2 and SW3 are switched in the same manner as above, and the switch SW6 is closed. In this state, a voice signal inputted to the MF signal input terminal 21 is transmitted to the office line, and a voice signal from the office line is inputted to a voice input terminal 24 of the automatic answering circuit 5 through the receive preamplifier output terminal 19 and the switch SW6.

A MF signal output terminal 33 of the dialer 15 is selectively connected, by a changeover switch SW4, to one input terminal of the adder 27 or a MF signal terminal 35 of the automatic answering circuit 5. Furthermore, the other input terminal of the adder 27 can be connected to the output terminal of an adder 37 by a switch SW5. One input terminal of the adder 37 is connected to the output terminal 26 of the confirmation tone transmission circuit 25, and the other input terminal is connected to a voice output terminal 38 of the automatic answering circuit 5. The switches SW4 and SW5 are controlled by a voltage signal from the line on terminal 14 of the automatic answering circuit 5. When these switches SW4 and SW5 are positioned as shown, a MF signal output from the dialer 15 is input to the speech network 9 through the adder 27. This MF signal is transmitted to the office line as previously described.

When a signal of H level is output from the line on terminal 14 of the automatic answering circuit 5, the switch SW4 is switched to the MF signal terminal 35 side and the switch SW6 is closed. In this state, a voice signal output from the voice output terminal 38 of the automatic answering circuit 5 and a confirmation tone outputted from the confirmation tone transmission circuit 25 are input to the speech network 9. As previously described, these voice signals are transmitted to the office line. The confirmation tone is also input to a confirmation tone input terminal 29 of the speech network 9, and is output from the receiver terminal 18 to the receiver 22.

The receive preamplifier output terminal 29 of the speech network 9 is connected also to the switch SW7, and the switch SW7 is connected to a voice input terminal 42 of a speech recognition circuit 41 through an amplifier 39 and a low-pass filter 40. The switch SW7 is turned ON by a voice command request signal given from a control circuit 43. When the switch SW7 is turned ON, a voice signal output from the receive preamplifier output terminal 19 of the speech network 9 is inputted to the speech recognition circuit 41. The speech recognition circuit 41 carries out, under control of the control circuit 43, detection of a voice period, digitalization, and extraction of the feature of an inputted voice signal to collate the extracted feature data with data registered in a memory 144. In this memory 144, feature data indicative of a plurality of voice signals can be registered in advance. The speech recognition circuit 41 makes a comparison between feature data of the input voice and the registered data in the memory 144 to carry out a calculation of similarity to select data of high similarity of the registered data to an extent recognized as substantially the same voice to transmit identification information of the selected registered data to the control circuit 43.

The control circuit 43 receives a voltage signal from the start terminal 44 of the automatic answering circuit 5. Upon receiving a signal of the H level from the start terminal 44, the control circuit 43 outputs a voice command request signal to the switch SW7 and a voice command request terminal 45 of the automatic answering circuit 5, and to activate the speech recognition circuit 41 at the same time. Thus, as previously described, a voice signal transmitted from the office line is inputted to the speech recognition circuit 41, and is collated with data registered in the memory 144. As a result, identification information indicative of data of coincidence is input to the control circuit 43. Upon receiving this identification information, the control circuit 43 drives the confirmation tone transmission circuit 25 to output a confirmation tone corresponding to the identification information, and drives the dialer 15 to output a MF signal corresponding to the identification information.

When the dialer 15 receives a signal of H level from the OR gate 46, it becomes operative. Two input terminals of the OR gate 46 are connected to the hook switch 13 and the line on terminal 14 of the automatic answering circuit, respectively. Accordingly, when the handset 12 is placed in an off-hook state, or when the automatic answering circuit 5 outputs a signal of H level to the line on terminal 14 in order to conduct an automatic answering operation, the dialer 15 becomes operative. After the dialer 15 has become operative, it outputs a MF signal or a DP signal in accordance with a control signal from the control circuit 43, or in accordance with a depressed key of the key matrix 47. Selection of the MF signal mode and the DP signal mode is carried out by a mode select switch (not shown).

Figure 2B:
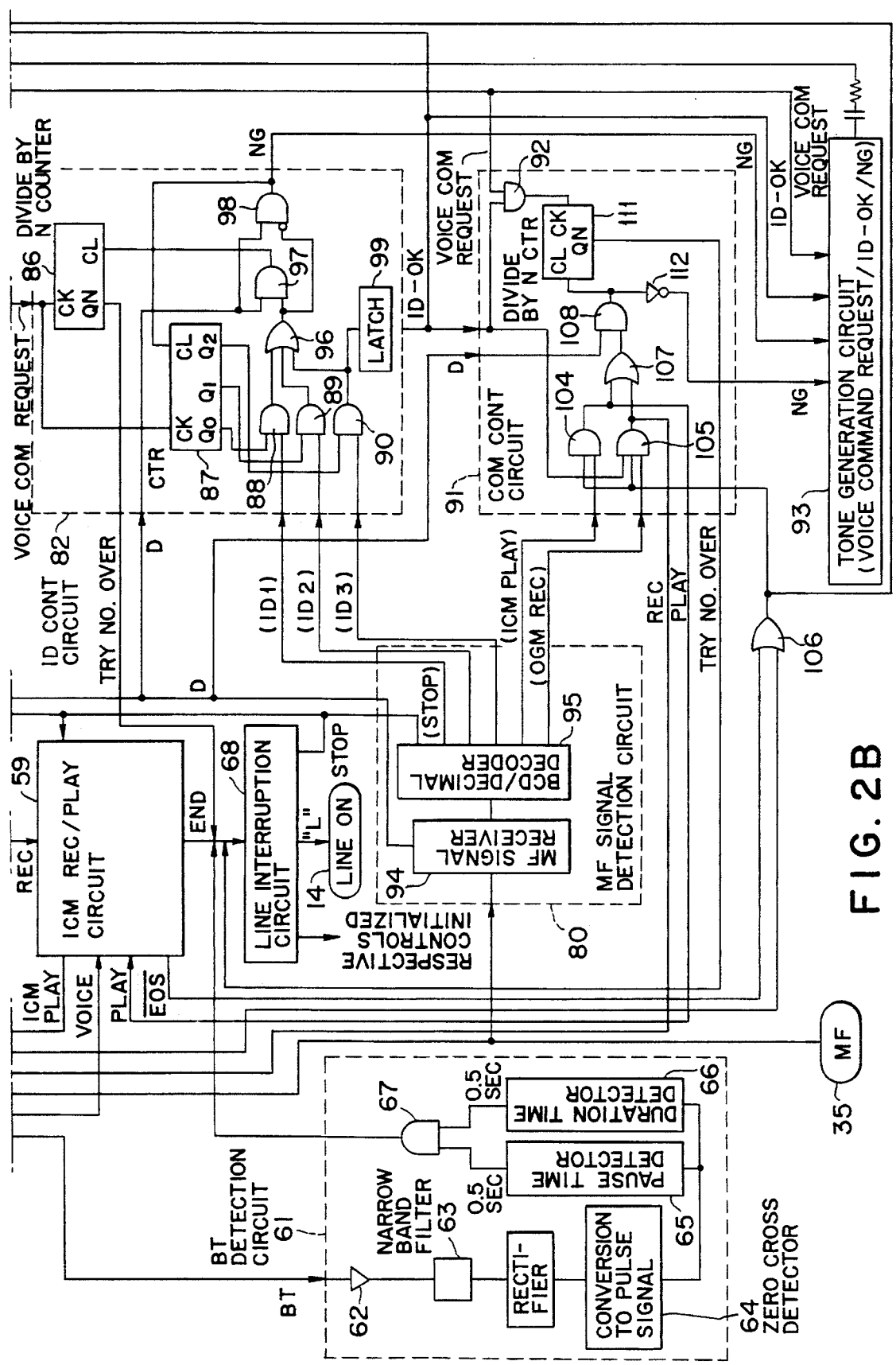

FIG. 2 shows the configuration of the automatic answering circuit 5. The operation of the entirety of the embodiment, and the configuration and the operation of the automatic answering circuit 5 will now be described with reference to FIGS. 1 and 2.

Ordinary operation of the terminal answering device

The ordinary operation of the terminal answering device is defined as the operation in the case where remote control by a voice command is not carried out, but detection of call incoming, playback of OGM, and recording of ICM, or sending of a dial tone are carried out.

The detail of this operation is as follows.

Referring to FIG. 1, when there is a call incoming from the office line, a call signal of 16 Hz is inputted to the terminals 1 every a predetermined interval. Upon receiving this calling signal, the call sound driver 2 drives the sounder 4 to generate a ring back tone, and the call detector 3 transmits a call detection signal of a rectangular waveform to the call detection signal terminal 6 of the automatic answering circuit 5.

Referring to FIG. 2, in the automatic answering circuit 5, a call detection signal input to the call detection signal terminal 6 is transmitted to a call incoming detection/ automatic responding circuit 50, at which the arrival number of call incoming signals is counted. When this count value reaches a predetermined number, e.g., three, the call incoming detection/automatic responding circuit 50 allows the line on terminal 14 to be at the H level and transmits a playback command (PLAY) signal to an OGM recording/playback circuit 51.

Referring to FIG. 1, when the line on terminal 14 is placed at H level, the line acquisition switch SW1 is turned ON to close the internal speech line 8. At the same time, in the speech network 9, the changeover switch SW2 is switched to the MF signal input terminal 21, and the switches SW3 and SW6 are turned OFF and ON, respectively. Thus, the circuit state is set so that an input voice signal from the office line is transmitted to the voice input terminal 24 of the automatic answering circuit 5, and a voice signal inputted to the MF signal input terminal 21 of the speech network 9 is transmitted to the office line. Furthermore, since the line on terminal 14 is at the H level, the dialer 15 becomes operative. At the same time, the changeover switch SW4 is switched to the MF signal terminal 35 side of the automatic answering circuit 5, and the switch SW5 is turned ON. It is to be noted that the dialer 15 is set in advance in a MF signal transmit mode. Thus, the circuit state is set so that a MF signal output from the dialer 15 is transmitted to the MF signal terminal 35 of the automatic answering circuit 5, and a voice signal output from the voice output terminal 38 of the automatic answering circuit 5 and a confirmation tone from the confirmation tone transmit circuit 25 are inputted to the MF signal input terminal 21 of the speech network 9 and are then transmitted to the office line.

Referring to FIG. 2, in an OGM recording/playback circuit 51, a PLAY signal from the circuit 50 is transmitted to a control circuit 53 through an OR gate 52. Upon receiving the PLAY signal, the control circuit 53 reads a recording position address of OGM from an OGM recording position memory 54 to initiate a read operation of OGM from the recording position address of an OGM memory 55. Meanwhile, OGMs are registered in advance in the OGM memory 55. The registration is conducted as follows. Namely, when a recording (REC) switch 120 is depressed, the control circuit 53 activates the OGM memory 55 and an analog digital converter 56 to start the recording operation. Along with this, a microphone on switch 121 is turned ON to allow a microphone to be operative. Subsequently, an OGM is input from this microphone 122. Thus, OGM is level-adjusted by an automatic level controller (ALC) 123. Then, the level adjusted OGM is input to the analog digital converter 56, and is converted to digital data. The digital data thus obtained is written into the OGM memory 55. When inputting of OGM is completed, a stop (STOP) switch 124 is depressed, so the control circuit stops the recording operation. Thus, registration of OGM is completed. The OGM which has been read out from the OGM memory 55 is transmitted to the analog digital converter 56, at which OGM is converted from digital data to an analog signal. The analog signal thus obtained is transmitted to the voice output terminal 38 through an adder 57, and is inputted to a voice detection circuit 58. Referring to FIG. 1, the OGM output from the voice output terminal 38 is input from the MF signal input terminal 21 to the speech network 9, and is then transmitted to the office line through the internal speech line 8.

Referring to FIG. 2, when playback of OGM is completed, the OGM recording/playback circuit 51 transmits an end signal to an ICM recording/playback circuit 59. This end signal serves as a recording command (REC) signal for the ICM recording/playback circuit 59. Thus, the ICM recording/playback circuit 59 initiates the recording operation. At this time, referring to FIG. 1, when an ICM transmitted by a calling subscriber is input from the office line, this ICM is input to the speech network 9 and is outputted from the receive amplifier output terminal 19. The ICM thus output is input to the voice input terminal 24 of the automatic answering circuit 5 via the switch SW6. Referring to FIG. 2, the ICM input to the voice input terminal 24 is subjected to processing for compensating loss in the office line by an automatic level controller (ALC) 60, and is then input to the ICM recording/playback circuit 59, at which it is converted to digital data. The digital data thus obtained is recorded into an ICM memory (not shown). Thereafter, when the calling subscriber conducts an operation of end of speech, a busy tone (BT) is transmitted from the office line. This BT is input to the automatic answering circuit 5 via the same path as that of ICM, and is then inputted to a BT detection circuit 61 via the ALC 60 in the automatic answering circuit 5. In the BT detection circuit 61, BT is amplified by an amplifier 62 and is subjected to processing for eliminating excess frequency components by a narrow band filter 63. The BT thus processed is input to a zero cross detector 64, at which it is converted to a pulse signal of 400 Hz. The pulse signal thus obtained is delivered to a signal duration time detector 66 and a signal pause time detector 65. The signal duration time detector 66 judges whether or not a duration time of the pulse signal of 400 Hz is 0.5 seconds, and the signal pause time detector 66 judges whether or not the pause time is 0.5 seconds. As a result, where the signal duration time and the pause time are both 0.5 seconds, a signal of the H level is output from the AND gate 67. This signal of H level is delivered to a line interruption circuit 68. Upon receiving this signal, the line interruption circuit 68 allows the line on terminal 14 to be at L level, and to transmit a stop command (STOP) signal to the ICM recording/playback circuit 59 to stop the recording operation. Referring to FIG. 1, as the result of the fact that the line on terminal 14 is placed at L level, switches SW1, SW2, SW3, SW4, SW5 and SW6 are all returned to the positions shown, so the operation of the dialer 15 is stopped. Thus, ordinary automatic answering operation is completed.

Operation of the terminal answering device by remote control using voice command This operation is defined as the operation in the case where recording and/or playback of a message, or sending of a dial tone are carried out by a remote control using a voice command.

Explanation will be initiated from the previously described time point when OGM has been transmitted. It is now assumed that a calling subscriber has spoken longer than a predetermined time during transmission of OGM. Referring to FIG. 1, a voice signal of this speaking is inputted from the office line to this terminal answering device, and is then input to the voice input terminal 24 of the automatic answering circuit 5 via the speech network 9 and the switch SW6. Referring to FIG. 2, the voice signal which has been input to the voice input terminal 24 is input to the voice detection circuit 58 via the ALC 60. As previously described, OGM is inputted to this voice detection circuit 58. This OGM and the voice signal from the calling subscriber are transmitted to a subtracter 69. The voice signal from the calling subscriber is a signal which has been mixed with OGM of which level is lowered by the antisidetone circuit 29 in the speech network 9. However, because that OGM is eliminated at the subtracter 69, the voice signal becomes a substantially pure signal. In this embodiment, the OGM input to the voice detection circuit 58 is passed through an amplifier 70 before it is input to the subtracter 59. Thus, that OGM is allowed to have a level equal to that of the OGM mixed with the voice signal. The substantially pure voice signal from the calling subscriber which has been output from the subtracter 69 is input to the non-inverting input terminal of a comparator 72 through a rectifier circuit 71, at which that voice signal is compared with a reference voltage applied to the inverting input terminal thereof. For a time period during which the level of the voice signal is higher than that of the reference voltage, the comparator 72 delivers a signal of H level to the clear ($\overline{CL}$) terminal of a counter 73. This signal of H level serves as a clear release signal for the counter 73. For a time period during which the signal of H level lasts, the counter 73 counts clock pulses from an oscillator 74. When the count value of clock pulses reaches a predetermined value, the counter 73 outputs a signal of the H level from the Q terminal. This signal of the H level is output as a voice detection signal through an output control circuit 75. Namely, where a voice signal having a level higher than a reference level is continuously input for more than a fixed time, a voice detection signal is output.

The voice detection signal is delivered as a pause command (PAUSE) signal to the control circuit 53 of the OGM recording/playback circuit 51. Upon receiving this PAUSE signal, the control circuit 53 reads out a pause position address set in advance in a pause position memory 77 to compare that pause address with a current readout address of the OGM memory 55. As a result, when the readout address is above the pause position address, the control circuit 53 immediately pauses playback. In contrast, when that readout address is not above the pause position address, the control circuit 53 conducts a playback up to the pause position address and then pauses that playback. It is to be noted that an area before the pause position address of the OGM memory 55 and an area after the pause position address thereof will be called "a prepause area 55a" and "a postpause area 55b", respectively. Setting of a pause position address is made by depressing a pause setting switch 178 during the above-described registration of OGM to thereby transmit a setting command from an OGM pause position setting circuit 179 to the control circuit 53, thus allowing the control circuit 53 to write an address written in the OGM memory 55 at that time point into the position setting memory 77. If an address of an end point of a suitable sentence in the OGM is set as the pause position address, where a voice is input from a calling subscriber before playback of that sentence or in the middle of playback thereof, playback is conducted until the end of that sentence and is then paused. Thus, an inconvenience is avoided such that playback is paused at an unnatural position like in the middle of the sentence. It is to be noted that where no setting of the pause position address is made, the OGM pause position setting circuit 179 delivers an inhibit signal to the output control circuit 75 in the voice detection circuit 58 to inhibit output of the voice detection signal. In this case, as understood from the description which will be made later, remote control by voice command cannot be made.

A voice detection signal output from the voice detection circuit 58 is also delivered to the voice command request circuit 78. In the voice command request circuit 78, a voice detection signal is applied to one input terminal of the AND gate 79. A voltage signal D from a MF signal detector 80 is applied to the other input terminal of the AND gate 79. This voltage signal D is ordinarily at H level. Thus, the AND gate 79 responds to input of the voice detection signal to output a signal of H level. This signal of H level is applied to one input terminal of an AND gate 81. An inverted signal of an ID detection signal from an ID control circuit 82 is applied to the other input terminal of the AND gate 81. This ID detection signal is ordinarily at L level. Thus, the AND gate 81 outputs a signal of H level. This signal is output to the start terminal 44 through an OR gate 83.

Referring to FIG. 1, the signal of H level from the start terminal 44 is inputted to the control circuit 43. Responding to this, the control circuit 43 outputs a voice command request signal to the switch SW7 and the voice command request terminal 45 of the automatic answering circuit 5. Thus, the switch SW7 is turned ON, whereby the circuit state is set so that a voice signal from the office line is input to the speech recognition circuit 41.

Referring to FIG. 2, the voice command request signal is input from the voice command request terminal 45 to a timer circuit 84. In the timer circuit 84, a retriggerable timer 85 is triggered by a voice command request signal to initiate a time counting operation. Simultaneously with this, the voice command request signal is input to respective (CK) terminals of a divide by N counter 86 and a trinary counter 87 in the ID control circuit 82. As a result, the trinary counter 87 sets the count value to 1 to output signals of H, L and L levels from Q0, Q1 and Q2 terminals, respectively. These signals are inputted to AND gates 88, 89 and 90, respectively. The voice command request signal is further input also to an AND gate 92 in a command control circuit 91 and a tone generation circuit 93. The tone generation circuit 93 can generate three kinds of different tones of a voice command request tone, an ID accept (ID-OK) tone, and an ID negate (NG) tone. When the tone generator circuit 93 receives a voice command request signal, it generates a voice command request tone. This voice command request tone is transmitted to the voice output terminal 38 through the adder 57.

Referring to FIG. 1, a voice command request tone transmitted from the voice output terminal 38 of the automatic answering circuit is input from the MF signal input terminal 21 to the speech network 9, and is transmitted to the office line through the internal speech line 8. Listening to a voice command request tone, a calling subscriber speaks a word corresponding to a dial number of the first digit. In this embodiment, the ID code is composed of dial numbers of three digits. It is now assumed that these digits are expressed as ID1, ID2, and ID3, respectively. It is further assumed that there are provided three kinds of commands of OGM recording command, ICM playback command, and recording/playback stop command. Let suppose that actual dial numbers and words are determined in advance with respect to these commands as shown in the Table 1 in this embodiment.

TABLE 1

| | | DIAL NO. | WORD |
|---|---|---|---|
| ID | ID1 | 1 | TOKYO |
| CODE | ID2 | 2 | KYOTO |
| | ID3 | 3 | OHSAKA |
| COMMAND | OGM RECORDING | 4 | RECORD |
| | ICM PLAYBACK | 5 | PLAY |
| | STOP | # | STOP |

Accordingly, a calling subscriber first speaks a word "TOKYO" corresponding to ID1. A voice command signal of "TOKYO" is input from the office line to the speech network 9 through the internal speech line 8. The voice command signal thus input is outputted from the receive preamplifier output terminal 19, and is then inputted to the speech recognition circuit 41. When the speech recognition circuit 41 receives the voice signal of "TOKYO", it extracts the feature data thereof to collate the extracted feature data with data in the memory 144. In the memory 144, feature data for registration of an unspecified speaker of the six kinds of words shown in Table 1 are registered in advance. When the speech recognition circuit 41 recognizes, by the above-mentioned collation, an inputted voice command signal to be in correspondence with "TOKYO", it transmits data indicative of the recognized result to the control circuit 43. When the control circuit 43 receives data indicative of that recognized result, it drives the dialer 15 to output a MF signal of the dial number "1" and allow the confirmation tone transmission circuit 25 to output therefrom a confirmation tone indicating that speech recognition has been made. The correspondence relationship of the speech recognition result, the MF signal output, and the confirmation tone is as shown in Table 2. It is to be noted that confirmation tones 1 to 6 in Table 2 may be suitable different, respectively, or may be the same tone.

TABLE 2

| RECOGNIZED RESULT | MF SIGNAL (DIAL NO.) | CONFIRMATION TONE |
|---|---|---|
| TOKYO | 1 | CONFIRMATION TONE 1 |
| KYOTO | 2 | CONFIRMATION TONE 2 |
| OHSAKA | 3 | CONFIRMATION TONE 3 |
| RECORD | 4 | CONFIRMATION TONE 4 |
| PLAY | 5 | CONFIRMATION TONE 5 |
| STOP | # | CONFIRMATION TONE 6 |

The MF signal output from the dialer 15 is input to the MF terminal 35 of the automatic answering circuit 5 through the switch SW4. Furthermore, its corresponding confirmation tone is input from the terminal 21 to the speech network 9, and is then transmitted to the office line through the internal speech line 8.

Referring to FIG. 2, the MF signal "1" which has been input to the MF terminal 35 is input to an MF signal receiver 94 of a MF signal detector 80, at which it is converted to a BCD code. The BCD code thus obtained is then input to a BCD/decimal decoder 95. The decoder 95 decodes this BCD code. Since the decoded result is "1" in this case, an output terminal corresponding to ID1 is placed at H level.

The correspondence relationship between the BCD code inputted to the decoder 95 and the output terminal of the decoder 95 placed at H level is as shown in Table 3.

TABLE 3

| BCD CODE (DIAL NO.) | OUTPUT TERMINAL |
|---|---|
| 1 | ID1 |
| 2 | ID2 |
| 3 | ID3 |
| 4 | OGM RECORDING |
| 5 | ICM PLAYBACK |
| # | STOP |

A signal of the H level output from the output terminal of ID1 is applied to one input terminal of the AND gate 88 in the ID control circuit 82. As previously described, since a signal of H level is applied from the trinary counter 87 to the other input terminal of the AND gate 88, the AND gate 88 outputs a signal of H level. This signal of H level is applied to one input terminal of the AND gate 97 through the OR gate 96, and is applied to one input terminal of the AND gate 98 with the level thereof being inverted to L level. A voltage signal D is delivered from the MF signal receiver 94 to the other input terminal of the AND gate 97. This signal D is ordinarily at the H level as previously described. Accordingly, the AND gate 97 outputs a signal of H level. Thus, the count value of the divide by N counter 86 is cleared.

After the reception of one MF signal is completed, the MF receiver 94, the MF signal receiver 94 momentarily places the voltage signal D at L level. The pulse of L level is input to the voice command request circuit 78. As a result, a pulse of L level is output to the start terminal 44. This pulse is input to the control circuit 43 (FIG. 1). As a result, the control circuit 43 outputs a voice command request signal in response to the rise edge of the backward end of that pulse. Thus, in the same manner as in the previously described case, a voice command request tone is transmitted to a calling subscriber, and a voice command request signal is delivered to the divide by N counter 86 and the trinary counter 87 in the ID control circuit 82. As a result, the count value of the trinary counter 87 becomes equal to 2. Thus, Q0, Q1 and Q2 output terminals are placed at the L, H and L levels, respectively.

Listening to a voice command request tone, a calling subscriber speaks a word "KYOTO" corresponding to the dial number "2" of ID2. This voice command signal is recognized by the speech recognition circuit 41, so a MF signal of the dial number "2" is outputted from the dialer 15. This MF signal "2" is transmitted to the MF signal terminal 35 of the automatic answering circuit 5, and is then input to the MF signal receiver 94. Thus, the BCD/decimal decoder 95 places an output terminal corresponding to ID2 at H level. This signal of H level is applied to one input terminal of the AND gate 89. Since the signal of H level is delivered from the Q1 output terminal of the trinary counter 87 to the other input terminal of the AND gate 89 as previously described, the AND gate 89 outputs a signal of H level. This signal is delivered to the AND gates 97 and 98 through the OR gate 96. Thus, the AND gate 97 clears the count value of the divide by N counter 87.

When reception of ID2 is completed in this way, the MF signal receiver 94 outputs a pulse of L level as previously described. This pulse is transmitted from the start terminal 44 to the control circuit 43 through the voice command request circuit 78, whereby the third voice command request is made. Thus, Q0, Q1 and Q2 output terminals of the trinary counter 87 are placed at L, L and H levels, respectively. Moreover, a calling subscriber speaks a word "OSAKA" corresponding to the ID3 "3". This word is subjected to speech recognition, so a MF signal of ID3 "3" is input to the MF signal receiver 94. As a result, the BCD/decimal decoder 95 places an output terminal corresponding to ID3 at H level. Thus, the AND gate 90 outputs a signal of H level. This signal is applied to the AND gate 97 through the OR gate 96. As a result, the counter 86 is cleared. The above-mentioned signal is also inputted to a latch circuit 99. The latch circuit 9 latches a signal of H level from the AND gate 90 to output an ID-OK signal of H level.

The operation in the case where an ID code is correctly transmitted by a voice command from a calling subscriber has been described. On the other hand, the operation in the case where an ID code is not correctly transmitted is as follows. When a voice command request is made, the divide by N counter 86 in the ID control circuit 82 set the count value to "1". If an input voice command signal from a calling subscriber is not in correspondence with a registered word, the dialer 15 outputs, by a command from the control circuit 43, a specific MF signal which is not entirely related to the ID code and the command. This MF signal is input to the MF signal receiver 94, and is decoded by the decoder 95. At this time, the decoder 95 does not allow any output terminal thereof to be at the H level. Thus, since any one of AND gates 88, 89 and 90 does not output a signal of H level, the AND gate 97 does not clear the count value "1" of the divide by N counter 86. Furthermore, the output of the AND gate 98 is kept at the H level. This signal of H level clears the trinary counter 87, and is input to the tone generation circuit 93 as a NG signal. Thus, the tone generation circuit 93 generates a NG tone. Subsequently, as previously described, the MF signal receiver 94 momentarily places the voltage signal D at L level. As a result, the control circuit 43 (FIG. 1) generates a voice command request signal in response to the rise edge of the backward end of that pulse of L level, and the tone generation circuit 93 outputs a voice command request tone.

Listening to the NG tone, the calling subscriber recognizes that the earlier voice signal is not accepted, and then carries out input of a voice signal for a second time after listening to a voice command request tone. In this case, as previously described, the trinary counter 87 is cleared, so Q0, Q1 and Q2 output terminals are placed at H, L, and L levels, respectively. Accordingly, the calling subscriber must carry out input from the ID code ID1 for a second time. If a voice command signal input for a second time in this way is again not correct, an NG signal is generated for a second time. Subsequently, a voice command request signal is generated. Thus, the count value of the divide by N counter 86 becomes equal to "2", and this count value is not also cleared. When an erroneous input of a voice signal is repeated in this way, the count value of the divide by N counter 86 continues to increase. When that count value reaches a predetermined limit number N, a try number over signal is output from the QN terminal. This signal is delivered to the line interruption circuit 68. Thus, the line interruption circuit 68 returns the potential level on the line terminal 14 to L level to allow the line acquisition switch SW1 to be turned OFF.

When a voice command request is made, the retriggerable timer 85 in the timer circuit 84 initiates a time count operation. When the retriggerable timer 85 has counted a time of M seconds set in advance, it outputs a time out signal to one input terminal of the AND gate 101. An inverted signal of an ID-OK signal is applied to the other input terminal of the AND gate 101 through the inverter 102. Accordingly, in the case where an ID code is not correctly input for M seconds from the time when a voice command request has been made, the AND gate 101 receives a time out signal from the retriggerable timer 85 to output a signal of H level. This signal is delivered, as a PAUSE release signal, to the control circuit 53 in the OGM recording/playback circuit 51. Thus, the control circuit 53 restarts playback of OGM from an address succeeding the pause position address.

In the case where a voice indicative of an ID code is correctly input during pause of playback of OGM as previously described, an ID-OK signal of H level is outputted from the ID control circuit 82. This ID-OK signal is input to one input terminal of the AND gate 81 of the voice command request circuit 78 with the level thereof being inverted.

Thus, the voice command request circuit 78 outputs a voltage signal having a level corresponding to a level (ordinarily, H level) of the other input terminal of the OR gate 83. Further, the ID-OK signal is input as a stop command (STOP) signal, to the OGM recording/playback circuit 51, and is then delivered to the control circuit 53 through the OR gate 103. Thus, the control circuit 53 switches the playback of OGM from the pause (PAUSE) state to the stop (STOP) state. Furthermore, the ID-OK signal is also input to the command control signal 91, and is then applied to the AND gate 92 and three-input AND gates 104 and 105. In addition, the ID-OK signal is applied to the tone generation circuit 93. Thus, the tone generation circuit 93 generates an ID-OK tone. This tone is transmitted to the office line.

When the calling subscriber listens to the ID-OK tone to recognize that the ID code has been accepted, he then speaks a word "RECORD", "PLAY" or "STOP" corresponding to a desired command. This voice command signal is recognized by the speech recognition circuit 41. As a result, a MF signal of a corresponding dial number "4", "5" or "#" is outputted from the dialer 15. The MF signal indicative of this command is input to the MF signal receiver 94 through the MF signal terminal 35 of the automatic answering circuit 5. As a result, the BCD/decimal decoder 95 allows an output terminal corresponding to that command to be placed at the H level.

Assuming now that the output terminal corresponding to ICM playback is placed at H level, this signal of the H level is applied to the AND gate 104. Since the ID-OK signal of the H level from the latch circuit 99 and the voltage signal of the H level from the OR gate 106 are applied to the AND gate 104, the AND gate 104 outputs a signal of H level. This signal of H level from the AND gate 104 is applied to the AND gate 108 through the OR gate 107 to clear the divide by K counter 92, and is also delivered to the ICM recording/playback circuit 59 as a playback command (PLAY) signal. Thus, the ICM recording/playback circuit 59 initiates playback of the recorded ICM. The ICM thus played back is output from the voice output terminal 38 through the adder 57, and is then transmitted to the office line through the speech network 9 (FIG. 1).

Assuming now that an output terminal corresponding to OGM recording of the BCD/decimal decoder 95 is placed at H level, this signal of H level is applied to the AND gate 105. As a result, this AND gate 105 outputs a signal of H level. The output signal from the AND gate 105 is applied to the AND gate 108 through the OR gate 107 to clear the divide by N counter 111, and is also inputted to the OGM recording/playback circuit 51 as a recording command (REC) signal. In the OGM recording/playback circuit 51, the REC signal is delivered to the control circuit 53 through the OR gate 109. Thus, the control circuit 53 drives the analog digital converter 56 to initiate the recording operation. When the recording operation is initiated, a calling subscriber speaks the OGM that he desires to record. This OGM is transmitted to the voice input terminal 24 of the automatic answering circuit 5 through the speech network 9, and is then input to the analog digital converter 56 via the ALC 60 and the adder 110. The digitalized OGM thus obtained is written into the OGM memory 55. In this case, that OGM is written into the prepause area 55a of the OGM memory 55. When such a recording is conducted until the pause position address, the OGM recording/playback circuit 51 stops recording.

In a manner stated above, playback of ICM or recording of OGM is carried out in accordance with a command inputted by voice. The ICM recording/playback circuit 59 and the OGM recording/playback circuit 51 allow service execution ($\overline{EOS}$) signals to be placed at L level during executions of the ICM playback and the OGM recording, and allows the $\overline{EOS}$ signals to be at H level for a second time when executions of services are completed, respectively. Those $\overline{EOS}$ signals are applied to the AND gates 104 and 105 in the command control circuit 91 and to the OR gate in the voice command request circuit 78 through the OR gate 106. As described above, since each EOS signal is at L level during execution of playback of ICM or recording of OGM, the command control circuit 91 stops the control operation. When playback of ICM or recording of OGM is completed, the state of the EOS signal is returned to H level. Accordingly, the command control circuit 91 is returned to the state where it can output a REC signal or a PLAY signal in accordance with a signal from the BCD/decimal decoder 95. Furthermore, the voice command request circuit 78 allows the start terminal 44 to be placed at L level for a time during which the $\overline{EOS}$ signal is at L level. When the state of the $\overline{EOS}$ signal is returned to H level as the result of the fact that playback of ICM or recording of OGM is completed, the voice command request circuit 78 allows the logical state of the start terminal 44 to be returned to the H level. When the state of the start terminal 44 rises from the L level to the H level, the control circuit 43 (FIG. 1) generates a voice command request signal in response to this change. This voice command request signal is inputted to the tone generator 93 through the voice command request terminal 45. Thus, a voice command request tone is transmitted to the calling subscriber for a second time.

Let now suppose that, listening to that voice command request tone, the calling subscriber wishes to allow the terminal answering device to further conduct a different operation. In that case, he speaks a word corresponding to a command instructing that operation, i.e., "PLAY" or "RECORD". In contrast, if the calling subscriber does not wish to request a further service, he speaks the word "STOP" instructing stop of the operation. Where the calling subscriber has spoken "STOP", a MF signal of the dial number "#" corresponding to "STOP" is output from the dialer 15. Thus, the BCD/decimal decoder 95 allows the output terminal corresponding to "STOP" to be placed at H level. This signal of H level is inputted, as a STOP signal, to the line interruption circuit 68, the ICM recording/playback circuit 59, and the OGM recording/playback circuit 51. Thus, the ICM recording/playback circuit 59 and the OGM recording/playback circuit 51 are placed in a stopped state, and the line interruption circuit 68 allows the line on terminal 14 to be placed at L level to open the line acquisition switch SW1.

The operation in the case where a command is correctly inputted by voice has been described. On the other hand, the operation in the case where a command is not correctly inputted is as follows. When a voice command request is made, the divide by N counter 111 counts up by one. Thereafter, if a voice which does not correspond to any command is input, a MF signal which does not correspond to any command is inputted to the MF signal receiver 94 as previously described. Accordingly, the output signal from the AND gate 108 in the command control circuit 91 remains at L level, so the count value of the divide by N counter 111 is not cleared. Furthermore, the signal of the L level from the AND gate 108 is converted to a signal of the H level at the inverter 112. This signal of the H level is inputted to the tone generator 93 as a NG signal. As a result, a NG tone is transmitted to the calling subscriber. Subsequently, the MF signal receiver 94 transmits a pulse signal of the L level to the voice command request circuit 78. Thus, a next voice command request is made. The divide by N counter 111 further counts up by one. Listening to the NG tone and the voice command request tone, the calling subscriber carries out a command input operation by voice for a second time. Where that input voice is erroneous, the same operation as the above is repeated in the automatic answering circuit 5. If an erroneous voice is input N times, the divide by N counter 111 outputs a try number over signal from the QN terminal. This signal is input to the line interruption circuit 68. As a result, the line interruption circuit 68 allows the line on terminal 14 to be placed at L level to cause the line acquisition switch SW1 to be turned OFF, and to output a STOP signal to place the ICM recording/playback circuit 59 and the OGM recording/playback circuit 51 in a stopped state. Furthermore, the line interruption circuit 68 generates a control initialization signal to initialize the states of various control circuits in the automatic answering circuit 5, i.e., allow them to be placed for a second time in the state before a call detection signal is input.

The operation in the case where a calling subscriber ends a speech during the operation of the automatic answering circuit 5 is as follows. A busy tone (BT) of 400 Hz from the office line is input from the voice input terminal 24 to the BT detector 61. Any unnecessary signal such as ICM or OGM, etc. input along with BT is eliminated by the narrow band filter 63. Only BT of 400 Hz is transmitted to the zero cross detector 64 and is converted to a pulse signal. The pulse signal thus obtained is input to the signal duration time detector 66 and the signal pause time detector 65. As a result, their outputs are placed at H level. Thus, the AND gate 67 outputs a signal of H level to the line interruption circuit 68. As a result, the line interruption circuit 68 is activated to open the line acquisition switch SW1, to stop the operation of the ICM recording/playback circuit 59 and the OGM recording/playback circuit 51, and to initialize various control circuits.

The operation by the remote control using voice command has been described. In addition, this embodiment may conduct a remote control by a MF signal in the same manner as in the prior art. In that case, a MF signal transmitted from the office line is input to the voice input terminal 24 of the automatic answering circuit 5 via the speech network 9 and the switch SW6, and is then input to the MF signal receiver 94. The operation after the MF signal has been input to the MF signal receiver 94 is the same as in the case of the remote control by voice command.

In addition, an approach may be employed to input a voice command from the hand set to transmit it to the speech recognition circuit to control the dialer in accordance with a recognized result from the speech recognition circuit to thereby carry out sending of a dial tone using a voice command.

In the above-described embodiment, in the voice detection for finding an occasion to enter the remote control mode by voice command, in order to correctly detect a voice signal from a calling subscriber, a method is employed to subtract OGM from an inputted voice signal, thus to eliminate OGM included in the input signal. In addition, the following method may be used in combination with the above-mentioned method, or may be substituted therefor. Namely, this method is to insert voiceless periods of a certain length every sentence or every suitable clauses or phrases in playing back OGM to make a voice detection at those voiceless periods. Even with this method, there is no possibility that OGM is mixed with a voice signal from a calling subscriber, thus making it possible to make a precise voice detection. Furthermore, when a method is employed to also make MF detection in those voiceless periods, remote control by MF signal as in the prior art can be precisely conducted. In addition, a method may be employed to make voice detection not only at the time of playback of OGM but also at the time of playback of ICM to use it as a trigger for switching to the remote control mode. In that case, such a use may be conveniently realized to shift to the next operation at the time point when listening of a necessary ICM is completed without listening to the remaining ICMs, etc.

While this invention has been described by taking an example of a terminal answering device, the applied field of this invention is not limited to only a terminal answering device, but this invention may be utilized for various communication equipment, home control systems, or electrified products, etc. for which remote control is required.

Since the system of this invention is constructed to receive a voice signal to recognize whether or not the received voice signal is in correspondence with a voice command signal of a word determined in advance to execute a corresponding operation if so, remote control by voice command can be made. Especially, where this invention is applied to a telephone terminal like a telephone terminal answering device, remote control can be conducted through a telephone line from other telephone terminals having no function to transmit a MF signal.

What is claimed is:

1. A terminal answering telephone system at least including acquisition means responsive to an incoming call transmitted through a communication line for acquiring said communication line, transmission means responsive to said incoming call for transmitting an outgoing message through said communication line after being acquired by said acquisition means, record means for recording a message of a caller for a predetermined time interval when the system is in a recording mode, and playback means for reproducing said message of said caller recorded by said record means, said system comprising:

certification means for certifying an establishment of a remote control mode, after performing a talking requirement requiring input of an identification (ID) code by a voice through said communication line connected to said caller when said recording mode is changed to a remote control mode and after said acquisition means acquires said communication line, and after checking agreement between said ID code by the voice and a reference ID code previously stored;

voice command introduction means for introducing a voice command from said caller through said communication line, after performing a talking requirement requiring input of said voice command, and after said certification means certifies said establishment of said remote control mode;

command recognition means for recognizing an introduced voice command by comparing said introduced voice command with a restored voice command; and control means for executing a predetermined command corresponding to said restored voice command in accordance with a recognition result of said command recognition means, wherein a change from said recording mode to said remote control mode is performed by said control means responsive to continuity of a voiced sound of a word for a predetermined time interval, which is inputted from said caller through said communication line while said transmission means transmits said outgoing message, thereby stopping transmission of said outgoing message from said transmission means when a change of modes is detected; and wherein said transmission means stops said transmission of said outgoing message having several bundles of meanings such that said transmission is stopped at any pauses of said several bundles of meanings when a detector detects said continuity of the voiced sound of said word for said predetermined time interval.

2. The terminal answering telephone system according to claim 1, wherein after said transmission means stops said transmission of said outgoing message, when said caller does not say said ID code even though said certification means demands an initial input of said ID code by said caller by said talking requirement of said ID code, said transmission restarts to transmit again said outgoing message at any of said pauses of meanings of said outgoing message.

* * * * *